(12) United States Patent
Bansyo (10) Patent No.: US 9,056,486 B1
(45) Date of Patent: Jun. 16, 2015

(54) INKJET IMAGE FORMING APPARATUS (71) Applicant: RISO KAGAKU CORPORATION, Tokyo (JP)

(72) Inventor: Toshihiro Bansyo, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 14/541,568

(22) Filed: Nov. 14, 2014

(30) Foreign Application Priority Data

Nov. 26, 2013 (JP) .................................. 2013-243469

(51) Int. Cl.
*B41J 29/38* (2006.01)
*B41J 2/21* (2006.01)

(52) U.S. Cl.
CPC ...................................... *B41J 2/2132* (2013.01)

(58) Field of Classification Search
USPC ........................................ 347/5, 9, 14, 15, 19
See application file for complete search history.

(56) References Cited

U.S. PATENT DOCUMENTS 5,831,642 A * 11/1998 Matsubara et al. ................ 347/9
5,997,123 A * 12/1999 Takekoshi et al. .............. 347/14

FOREIGN PATENT DOCUMENTS

| JP | 2006-137040 | 6/2006 |
| JP | 2011-83992 | 4/2011 |
| JP | 2011-218657 | 11/2011 |

OTHER PUBLICATIONS

U.S. Appl. No. 14/541,692 to Tsutomu Kurose, filed Nov. 14, 2014.

* cited by examiner

*Primary Examiner* — Lam Nguyen
(74) *Attorney, Agent, or Firm* — Greenblum & Bernstein, P.L.C.

(57) ABSTRACT

An inkjet image forming apparatus includes ink heads, a drive voltage controller that adjusts density by controlling each drive voltage of the ink heads, a halftone processing controller that adjusts density by changing the number of ink droplets ejected from each nozzle of the ink heads, and a density adjustment controller that prints and scans a density adjustment pattern to calculate an adjustment value of each density level. The density adjustment controller adjusts density of a lowest density level so that the drive voltage controller controls each drive voltage based on the adjustment value of the lowest density level, and adjusts density of each density level other than the lowest density level so that the halftone processing controller changes the number of ink droplets based on the adjustment value of each density level other than the lowest density level and the adjustment result by the drive voltage controller.

2 Claims, 8 Drawing Sheets

INKJET IMAGE FORMING APPARATUS

BACKGROUND OF THE INVENTION

1. Technical Field

The present invention relates to an inkjet image forming apparatus.

2. Background Arts

In a line-type inkjet image forming apparatus, plural ink heads are aligned along a direction perpendicular to a feed direction of print sheets, and printing is done by injecting ink droplets from the ink heads onto a print sheet that is being fed. The ink heads in such an inkjet image forming apparatus have different injection properties, so that a density difference may occur with respect to neighboring ink heads due to the different injection properties. If a density difference occurs with respect to neighboring ink heads, the density difference may be recognizable easily. Therefore, it is required to reduce such a density difference.

Figure 7:
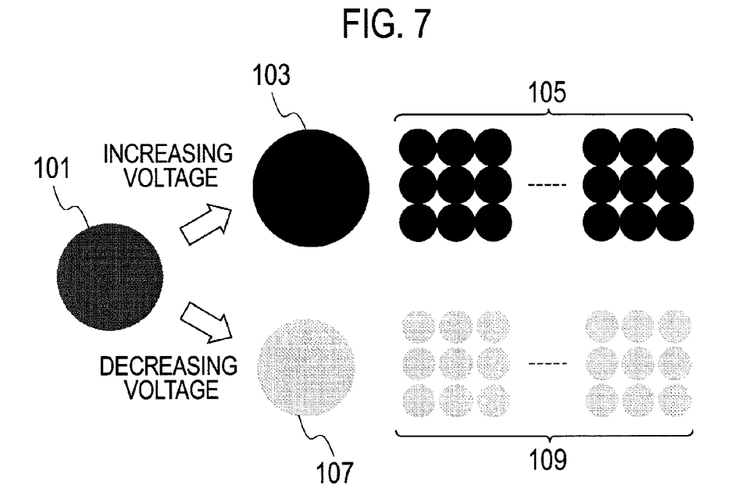
FIG. 7 is a diagram showing examples of a density adjustment by drive voltages.

In a prior-art inkjet image forming apparatus, there is proposed is a method adjusting density by (1) printing a print sheet with a print pattern by which a density difference is easily recognizable, or with an intermediary number of injected ink droplets by which a density difference is easily recognizable, (2) retrieving density of the print sheet by a scanner, and then (3) increasing or decreasing injection amounts of ink by relatively changing drive voltages (injection voltages) of neighboring ink heads (see Japanese Unexamined Patent Application Publication No. 2006-137040 [Patent Document 1], and Japanese Unexamined Patent Application Publication No. 2011-218657 [Patent Document 2]). Specifically, as shown in FIG. 7, density for dot (pixel) data 101 is increased by increasing a dot gain of a printed dot 103 by raising a drive voltage to make interspaces in a dot matrix 105 narrower. On the other hand, density for dot (pixel) data 101 is decreased by decreasing a dot gain of a printed dot 107 by lowering a drive voltage to make interspaces in a dot matrix 109 wider.

Figure 8:
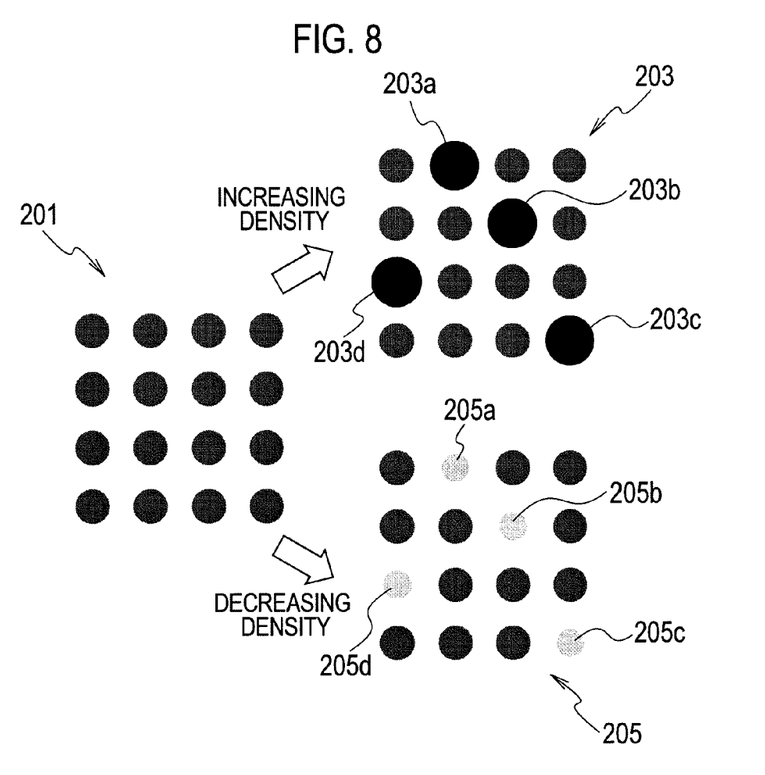
FIG. 8 is a diagram showing examples of a density adjustment by a halftone processing.

In addition, other than the density adjustment by changing drive voltages, there is a way for adjusting density through an image processing such as halftone processing in which the number of ink droplets per unit area is increased or decreased (see, Japanese Unexamined Patent Application Publication No. 2011-83992 [Patent Document 3]). Specifically, as shown in FIG. 8, when density of 4×4 dot (pixel) matrix data 201 is increased by a halftone processing, a dot matrix 203 is printed by increasing the number of ink droplets for dots 203a to 203d. On the other hand, when density of 4×4 dot (pixel) matrix data 201 is decreased by a halftone processing, a dot matrix 205 is printed by decreasing the number of ink droplets for dots 205a to 205d.

SUMMARY OF THE INVENTION

However, according to the inkjet image forming apparatus disclosed in the above Patent Document 1 or 2, if the scanned print pattern includes three density levels (a high density level, an intermediary density level and a low density level), density adjustment is done, in most cases, by focusing on the intermediary density level in consideration of balance of whole density when the density adjustment is done by changing injection voltages (drive voltages). Therefore, the density adjustment for the low and high density levels is subject to become insufficient.

Figure 9:
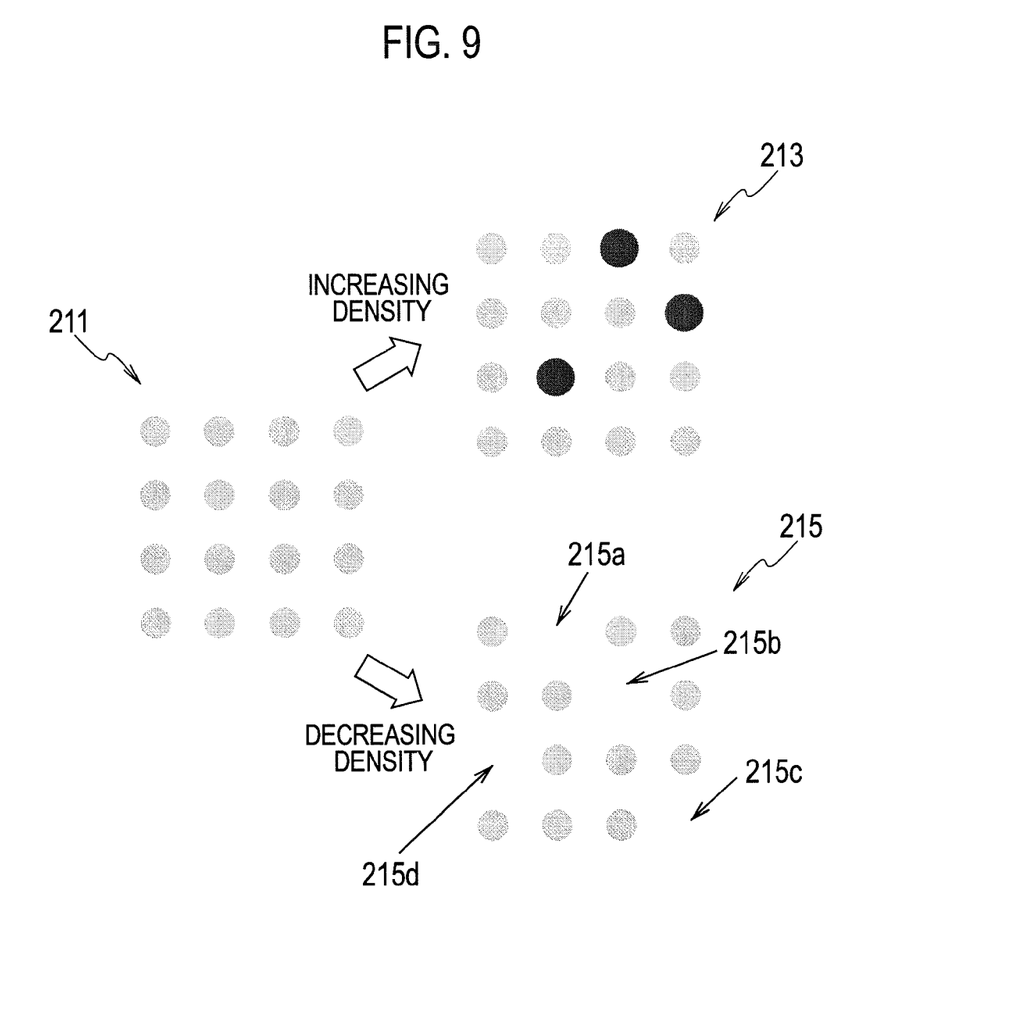
FIG. 9 is a diagram showing examples of another density adjustment by a halftone processing (colorless portions are generated).

In addition, according to the inkjet image forming apparatus disclosed in the above Patent Document 3, since a density adjustment is made by an image processing such as a halftone processing, a colorless portion(s) caused by the density adjustment for neighboring ink heads may be generated due to increase or decrease of the number of ink droplets injected from each ink head. Specifically, as shown in FIG. 9, in a case where density for dot (pixel) data 211 with the lowest level of the number of ink droplets to be injected is adjusted to be lower, colorless portions 215a to 215d at which no dot (image) is printed occur (see a printed dot matrix 215) and thereby printing quality degrades. On the other hand, with respect to dot (pixel) data 211 having density with a maximum level of the number of ink droplets to be injected, maximum density of a printed dot matrix 213 is subject to be low (insufficient) in whole, because it is needed to optimize density in consideration of ink heads with low density characteristics.

An object of the present invention is to provide an inkjet image forming apparatus that can adjust density at all density levels so as to reduce density differences among ink heads without generating a colorless portion.

An aspect of the present invention provides an inkjet image forming apparatus comprising: a plurality of ink heads that are aligned along a direction perpendicular to a feed direction of print sheet and configured to inject ink droplets with a plurality of density levels; a drive voltage controller configured to adjust density among the plurality of ink heads by controlling each drive voltage of the plurality of ink heads to change amounts of ink droplets injected from nozzles of the plurality of ink heads; a halftone processing controller configured to adjust density by changing the number of ink droplets ejected from each nozzle of the plurality of ink heads by a halftone processing; and a density adjustment controller configured to print a density adjustment pattern by injecting ink droplets from the nozzles of the plurality of ink heads with a single dot pitch to form different printed areas with respect to each of the plurality of density levels and with respect to each of the plurality of inkjet heads, and then scan the density adjustment pattern to calculate an adjustment value for reducing a density difference among the plurality of ink heads with respect to each of the plurality of density levels, wherein the density adjustment controller adjusts density of a lowest density level among the plurality of density levels so that the drive voltage controller controls each drive voltage of the plurality of ink heads based on the adjustment value of the lowest density level, and adjusts density of each density level other than the lowest density level so that the halftone processing controller changes the number of ink droplets injected from each nozzle of the plurality of ink heads by the halftone processing based on the adjustment value of each density level other than the lowest density level and an adjustment result by the drive voltage controller.

According to the aspect, the halftone processing is not done for the lowest density level, so that a density difference can be reduced without generation of a colorless portion(s). In addition, the halftone processing is done for other density levels than the lowest density level in addition to the density adjustment by the drive voltage controller, so that a density difference can be reduced also at the other density levels. As a result, the density adjustment can be done so that the density difference among the ink heads is reduced at all the density levels.

It is preferable that the density adjustment controller scans the density adjustment pattern printed with respect to each of the plurality of density levels and with respect to each of the plurality of inkjet heads, and the voltage drive controller controls each drive voltage of the plurality of ink heads based on a reference value including an average value of density of the density adjustment pattern of the lowest density level.

According to this configuration, the density can be adjusted within its adequate range required for adequate injection of ink droplets.

DESCRIPTION OF THE EMBODIMENTS

Hereinafter, an inkjet image forming apparatus 1 according to an embodiment will be explained with reference to the drawings.

The inkjet image forming apparatus 1 is an inkjet type line color printer by which printing is done per line by injecting ink droplets from nozzles of ink heads 12 provided on a head unit 10 served as an image forming unit. In addition, each of the ink heads 12 is a multi-drop type ink head that injects ink droplets sequentially from its single nozzle onto a single dot. A density level of the single dot can be changed according to the number of ink droplets (an amount of ink droplets) injected from the single nozzle onto the single dot.

Figure 1:
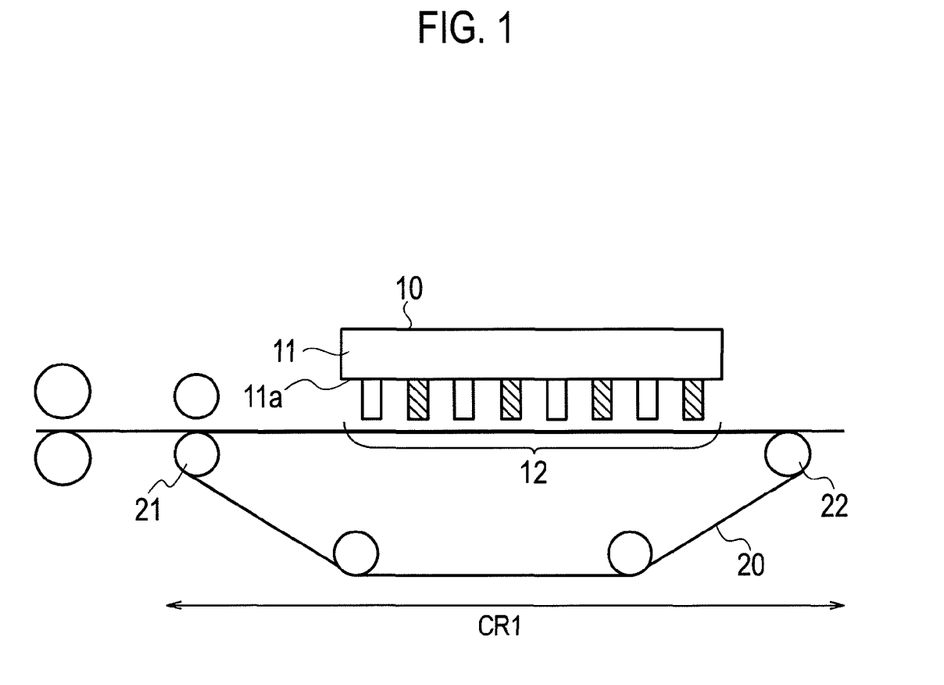
FIG. 1 is a schematic side view of an inkjet image forming apparatus according to an embodiment.

As shown in FIG. 1, the inkjet image forming apparatus 1 includes an image forming path CR1 served as its feed path. Along the image forming path CR1, print sheet P are fed by a platen belt 20 with a feed speed preset according to a print setting. The head unit 10 is provided above the image forming path CR1 so as to face the platen belt oppositely to each other. Ink droplets of each color are injected per line from nozzles of the ink heads 12 provided on the head unit 10 onto a print sheet P on the platen belt 20 so as to sequentially overlap plural printed lines with each other, and thereby an image is formed by the sequentially overlapped lines.

The image forming path CR1 is configured of the platen belt 20 that is an endless loop feed belt, and a driving roller 21 and a driven roller 22 that are a drive mechanism of the platen belt 20. A head holder 11 is disposed over the image forming path CR1, and the ink heads 12 are held by the head holder 11.

The platen belt 20 is moved circularly by the driving roller 21, and moved slidably within an area oppositely facing the ink heads 12 to feed a print sheet(s) P. Specifically, the platen belt 20 is wound around a pair of the driving roller 21 and the driven roller 22. Each rotational axis of the driving roller 21 and the driven roller 22 extends perpendicularly to a feed direction F (see FIG. 2A and FIG. 2B) of the print sheet(s) P. The platen belt 20 is circulated in the feed direction F by a drive force of the driving roller 21.

The head holder 11 has a box-shape, and has a head holder plane at its bottom. The head holder 11 holds and fixes the ink heads 12, and accommodates other mechanisms, by unitizing them, required for injecting ink droplets from the ink heads 12. The bottom plane of the head holder 11 is disposed oppositely to the feed path CR1 so as to be parallel to the feed path CR1.

Figure 2A:
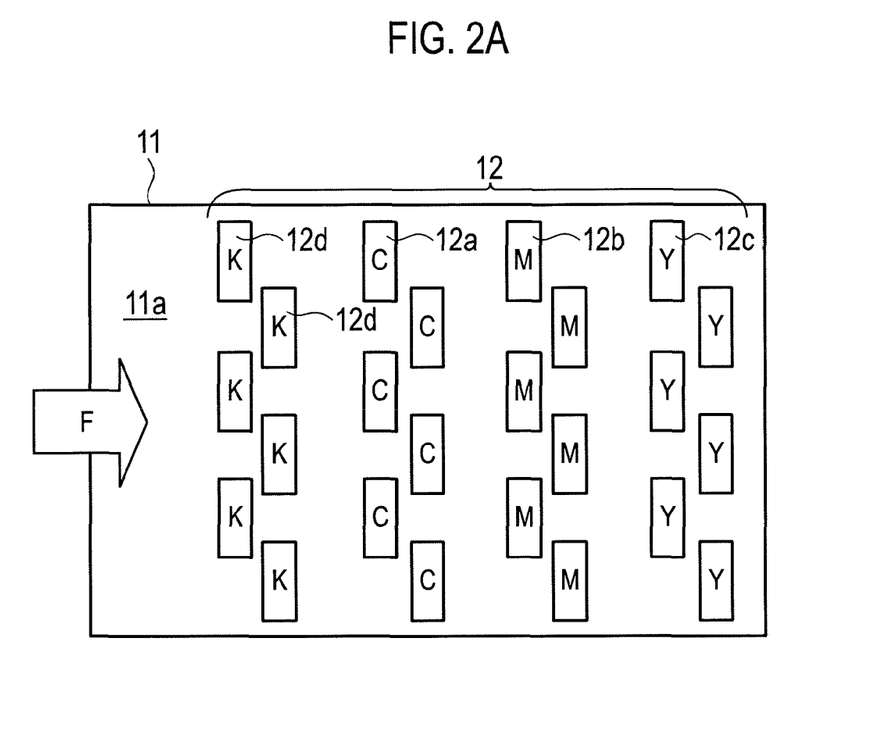
FIG. 2A is a bottom view of a head holder in the inkjet image forming apparatus.
Figure 2B:
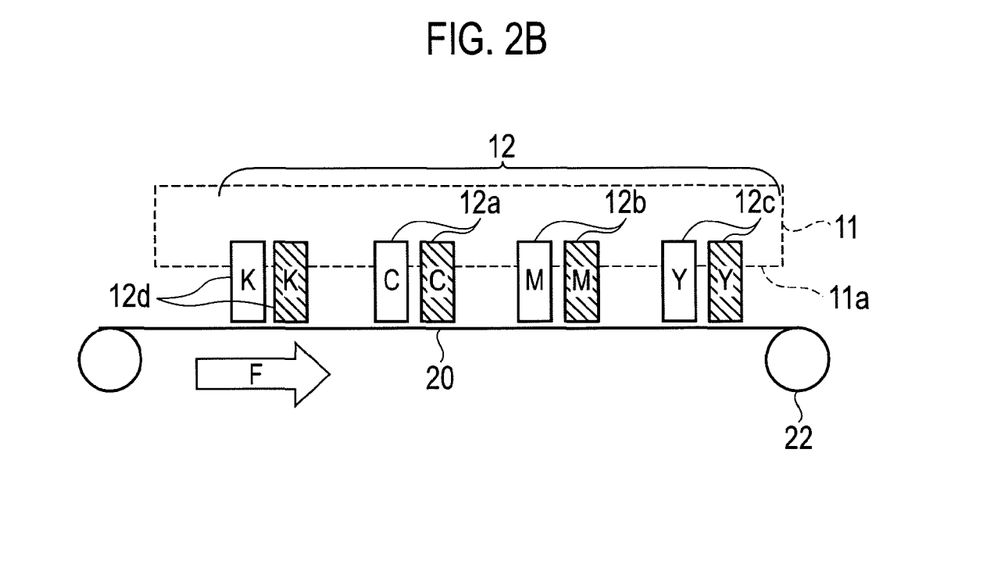
FIG. 2B is a side view of the head holder.

As shown in FIG. 2A and FIG. 2B, the ink heads 12 are provided in a plurality for each color, K (black), C (cyan), M (magenta) and Y (yellow). CMYK sets of the ink heads 12 are disposed along the feed direction F (a secondary sweep direction) color at intervals. The ink heads 12 of each color are aligned along a direction (a primary sweep direction) perpendicular to the feed direction F, and staggered alternately (displaced alternately along the feed direction F).

Figure 3:
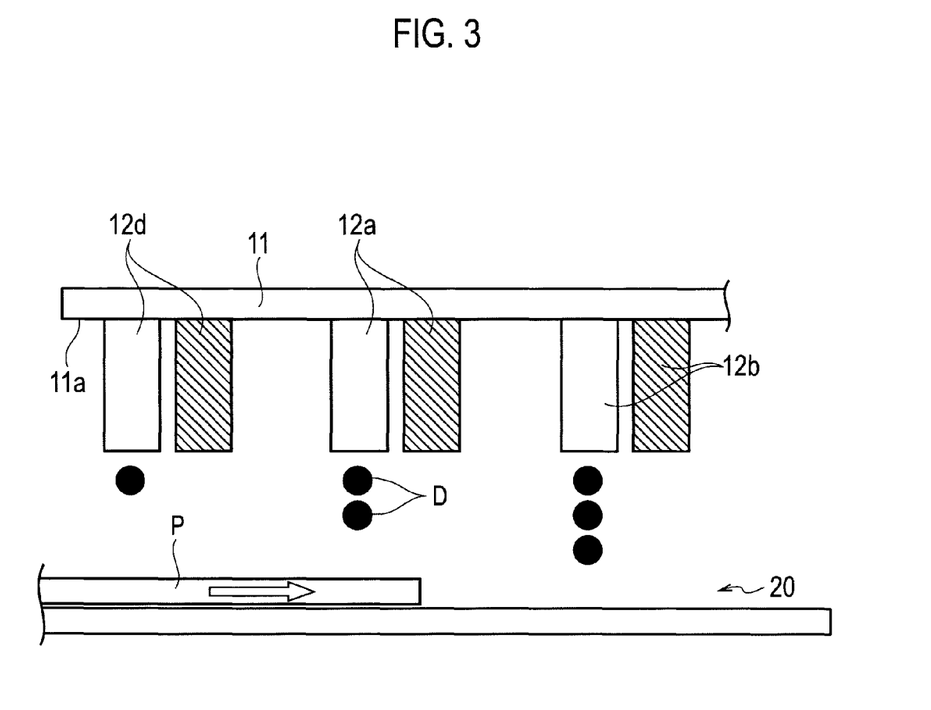
FIG. 3 is a schematic side view for explaining ink injection operations.

In addition, as shown in FIG. 3, the number of ink droplets D injected from the ink heads 12 can be changed. Density of dots changes according to the number of ink droplets D. The inkjet image forming apparatus 1 in the present embodiment is provided with a function for adjusting a size (an amount) of ink droplets. An adjustment of the amount of ink droplets can be done by adjusting drive voltages of the ink heads 12.

Figure 4:
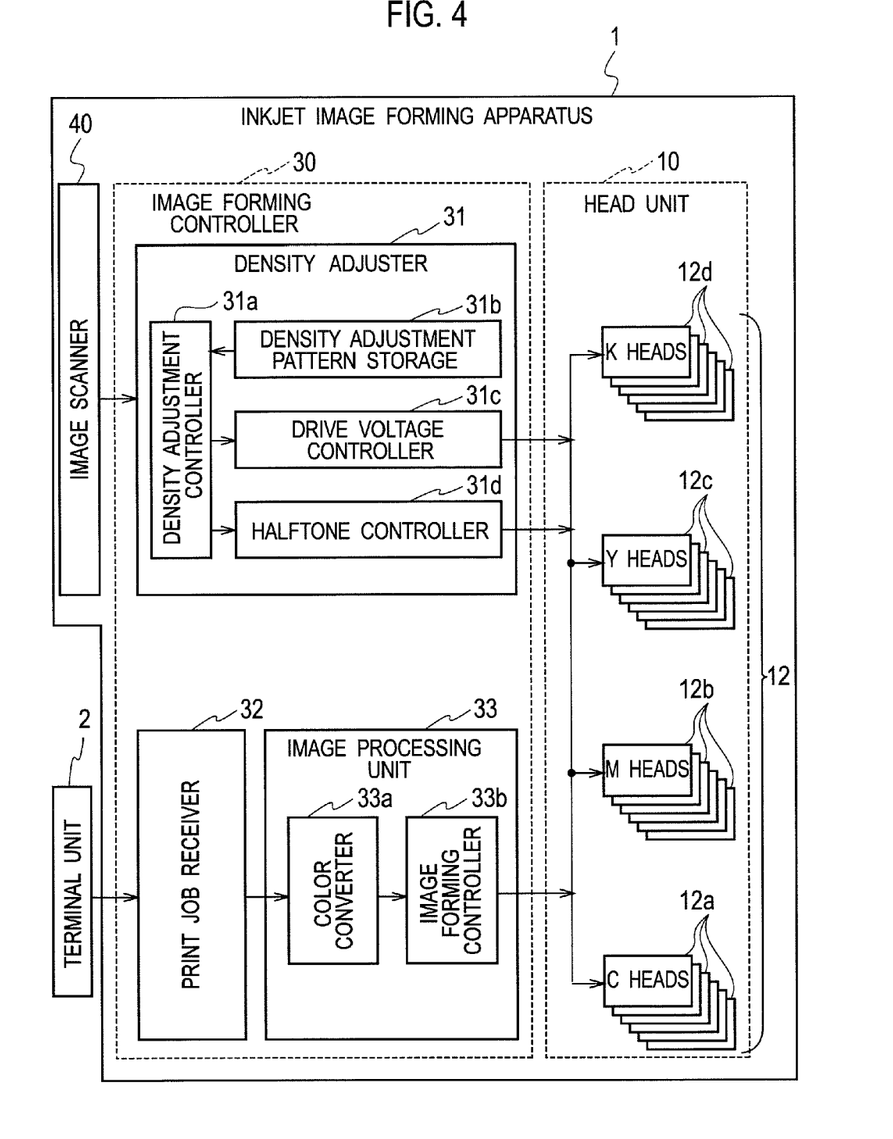
FIG. 4 is a block diagram of the inkjet image forming apparatus.

As shown in FIG. 4, the inkjet image forming apparatus 1 includes an image forming controller 30 for injecting ink droplets from the CMYK ink heads 12 of the head unit 10 to form an image(s). The image forming controller 30 includes a density adjuster 31, a print job receiver 32, and an image processing unit 33.

The density adjuster 31 is includes a density adjustment controller 31a, a density adjustment pattern storage 31b, a drive voltage controller 31c, and a halftone processing controller 31d. The density adjustment pattern storage 31b stores a density adjustment pattern(s) (test pattern(s)) used for confirming density when adjusting the density. The drive voltage controller 31c adjusts density among the ink heads 12 by controlling drive voltages of the ink heads 12 to change the amount of ink droplets injected from the ink heads 12. The halftone processing controller 31d adjusts density among the ink heads 12 or density by each of the ink heads 12 by changing the number of ink droplets injected from each nozzle of the ink heads 12 by a halftone processing.

The density adjustment controller 31a controls operations of an entire of the density adjuster 31. Specifically, the density adjustment controller 31a controls the drive voltage controller 31c to adjust density among the ink heads 12 so that the drive voltage controller 31c controls each drive voltage of the ink heads 12, based on an adjustment value of the lowest density level among after-explained plural density levels, to reduce a density difference among the ink heads 12.

In addition, the density adjustment controller 31a controls the halftone processing controller 31d to adjust density among the ink heads 12 or density in each of the ink heads 12 so that the halftone processing controller 31d changes the number of ink droplets injected from each nozzle of the ink heads 12 by the halftone processing, based on an adjustment value of each density level other than the above-explained lowest density level and the above-explained adjustment result (of the lowest density level) by the drive voltage controller 31c.

The print job receiver 32 stores a print job received from a terminal unit 2, and outputs the print job to an image processing unit 33. The image processing unit 33 includes a color converter 33a that converts an RGB print image in the print job from print job receiver 32 to a CMYK print image, and an image processing controller 33b that controls the ink heads 12 of the head unit 10 to execute printing based on image data of the converted CMYK print image.

Figure 5:
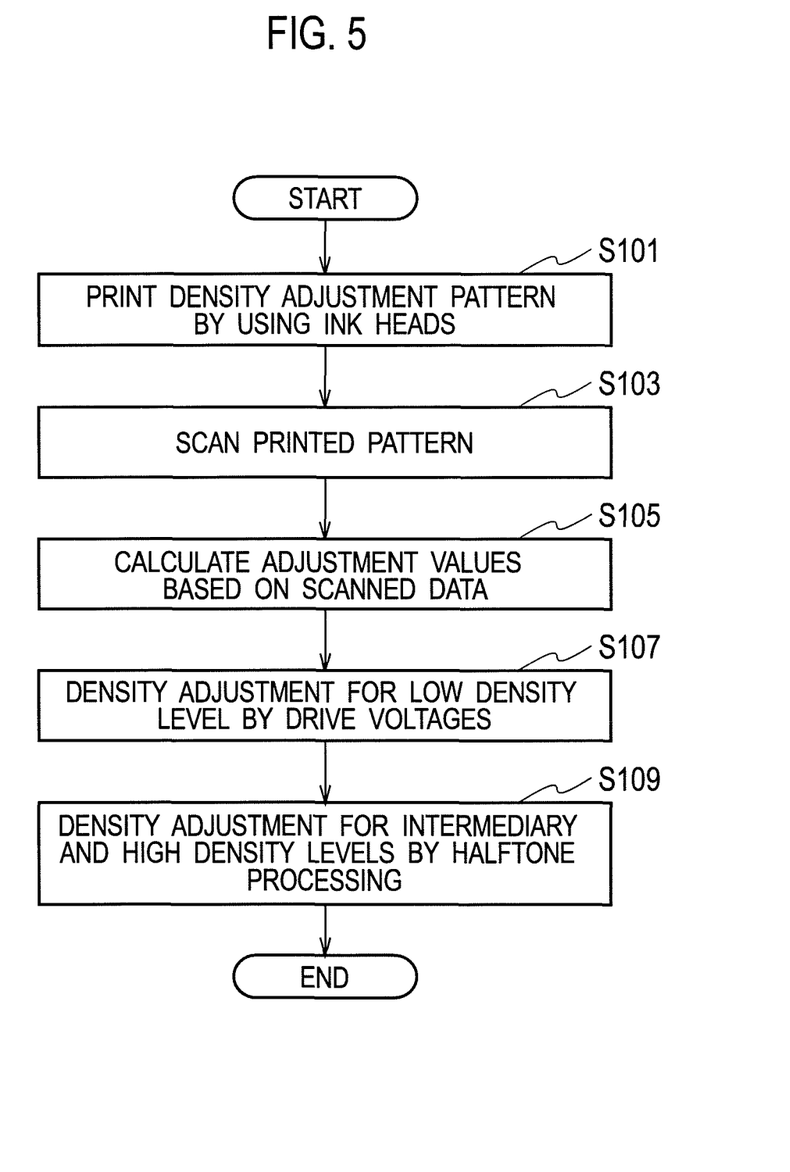
FIG. 5 is a flowchart of a density adjustment processing by the inkjet image forming apparatus.

Next, a density adjustment by the inkjet image forming apparatus 1 will be explained with reference to a flowchart shown in FIG. 5.

Figure 6A:
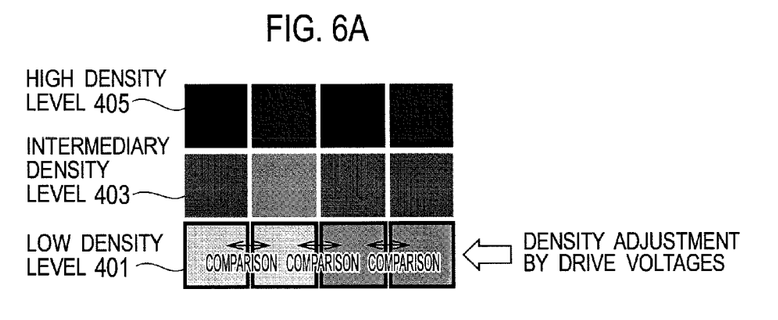
FIG. 6A is a diagram showing a state before a density adjustment is done.

In a case where an density adjustment of the ink heads 12 of the head unit 10 is to be done in a density adjustment mode in the inkjet image forming apparatus 1, the density adjustment controller 31a of the density adjuster 31 firstly reads out the density adjustment pattern (test pattern) preliminarily stored in the density adjustment pattern storage 31b, and then print the density adjustment pattern by injecting ink droplets associated with plural density levels (high, intermediary and low) from all nozzles of the ink heads 12 (12a, 12b, 12c or 12d) with a predetermined drive voltage and a predetermined halftone processing to print dots with a single dot pitch to form different printed areas with respect to each of the three density levels and with respect to the ink heads 12 (12a, 12b, 12c or 12d) (for example, a grid with squares as shown in FIG. 6A) (step S101).

Figure 6B:
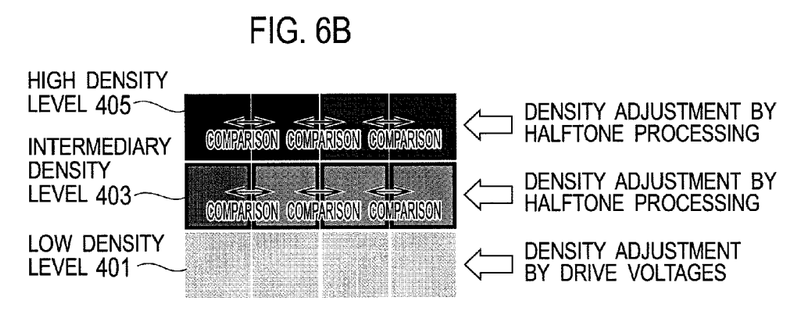
FIG. 6B is a diagram showing a state where the density adjustment is completed, by a drive voltage processing, only in areas with a low density level.
Figure 6C:
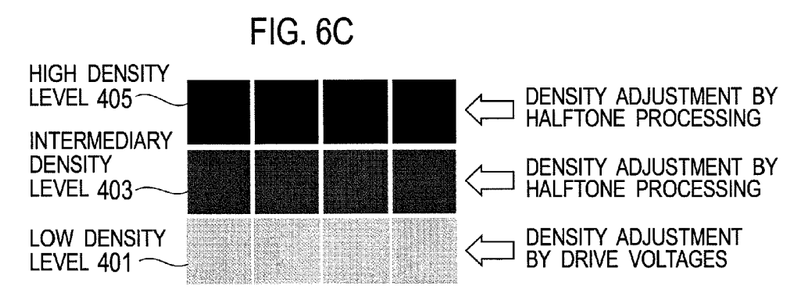
FIG. 6C is a diagram showing a state where the density adjustment is completed, by a halftone processing, also in areas with intermediary and high density levels.

Note that, in a case where each CMYK set of the six ink heads 12 are aligned along a direction perpendicular to the feed direction F as shown in FIG. 2A, the density adjustment pattern is printed by each of the six ink heads 12. In the present embodiment, the density adjustment pattern includes plural squares with three density levels, a low density level 401, an intermediary density level 403 and a high density level 405, as shown in FIG. 6A to FIG. 6C (explained later in detail). Therefore, the low density level 401 presents the lowest density level among the three density levels 401, 403 and 405.

Subsequently, the density adjustment controller 31a output a scan command to the image scanner 40 to scan a printed image including the above-explained density adjustment pattern (step S103). Note that, in a case where the six ink heads 12 are aligned for each CMYK color, the printed image including the density adjustment pattern is scanned for each of the six ink heads 12. Namely, six printed images each includes the density adjustment pattern shown in FIG. 6A are scanned for each color.

Subsequently, the density adjustment controller 31a calculates an adjustment value for each of the density adjustment pattern based on scanned data (step S105). The adjustment value is calculated for each of the low density level 401, the intermediary density level 403 and the high density level 405. Here, as the adjustment value, a compensated value for the drive voltage is used, for example. The compensated value is set to be adapted with an average value of densities of the six ink heads 12 of each color in this embodiment.

Subsequently, the density adjustment controller 31a controls the drive voltage controller 31c. The drive voltage controller 31c controlled by the density adjustment controller 31a adjusts the drive voltage of each of the ink heads 12 base on the adjustment value calculated for each color so that densities of the low density level 401 with each color of CMYK by the ink heads 12 (12a, 12b, 12c or 12d) are made closer to an average value of the densities. Concurrently, the density adjustment controller 31a adjusts an amount of ink droplets associated with the plural density levels to be injected from the ink heads 12 (step S107).

Here, the drive voltage controller 31c preliminarily set a maximum compensated value and a minimum compensated value of the adjustment value (the compensated value of the drive voltage) so that the density can be adjusted within its adequate range required for adequate injection of ink droplets, and may change target density to adjust the density within the adequate range in a case where an adjustment value for an ink head(s) 12 becomes larger than the maximum compensated value or becomes smaller than the minimum compensated value.

As a result, with respect to the lowest density level (i.e. the low density level 401), since the density adjustment is done by adjusting the drive voltages of nozzles of the ink heads 12 without the density adjustment by the halftone processing, generation of a colorless portion(s) 215a to 215d as shown in FIG. 9 is prevented.

Subsequently, the density adjustment controller 31a controls the halftone processing controller 31d to adjust the density of the intermediary density level 403 and the high density level 405 (step S109). The halftone processing controller 31d controlled by the density adjustment controller 31a executes the halftone processing based on the adjustment value calculated in step S105 and the adjustment results of the low density level 401 by the drive voltage controller 31c so that densities of the intermediary density level 403 printed with each color of CMYK by the ink heads 12 (12a, 12b, 12c or 12d) are made closer to an average value of the densities. In addition, the halftone processing controller 31d controlled by the density adjustment controller 31a executes the halftone processing based on the adjustment value calculated in step S105 and the adjustment results of the low density level 401 by the drive voltage controller 31c so that densities of the high density level 405 with each color of CMYK by the ink heads 12 (12a, 12b, 12c or 12d) are made closer to an average value of the densities.

Here, the halftone processing controller 31d calculates an intermediary density compensation coefficient according to a scanning result of intermediary density ink droplets (in the intermediary density level 403), and calculates a high density compensation coefficient according to a scanning result of high density ink droplets (in the high density level 405). And then, the halftone processing controller 31d adjusts the density of the intermediary density level 403 by compensating the number of ink droplets to be injected from nozzles of the ink heads 12 by using the calculated intermediary density compensation coefficient. Concurrently, the halftone processing controller 31d adjusts the density of the high density level 405 by compensating the number of ink droplets to be injected from nozzles of the ink heads 12 by using the calculated high density compensation coefficient.

As a result, with respect to the intermediary density level 403, since the density adjustment is done by the halftone processing in addition to the compensation of the drive voltage for the low density level 401, the density difference among the ink heads 12 can be reduced sufficiently. Similarly, with respect to the high density level 405, since the density adjustment is done by the halftone processing in addition to the compensation of the drive voltage for the low density level 401, the density difference among the ink heads 12 can be reduced sufficiently.

Then, the density adjustment is completed. In the inkjet image forming apparatus 1 after the completion of the density adjustment, the print job receiver 32 receives a print job when the print job is transmitted from the terminal unit 2, and then the color converter 33a of the image processing unit 33 converts RGB print image to CMYK print image and outputs the converted to the image processing controller 33b. The image processing controller 33b controls the ink heads 12 of the head unit 10 to execute printing based on the CMYK print data.

FIG. 6A to FIG. 6C shows processes of the above-explained density adjustment schematically. The grid with squares shown in FIG. 6A is printed with any one color of CMYK, and scanned by the image scanner 40 in the above-explained step S103. Although the six ink heads 12 (12a, 12b, 12c or 12d) are provided for each color as shown FIG. 2A in the present embodiment, only four squares are shown in FIG. 6A to FIG. 6C in each density level for the sake of convenience for explanations.

As shown in FIG. 6A, there is a density difference in each density level before the density adjustment is done. FIG. 6B schematically shows a state where the density adjustment by using the drive voltage is done only to the lowest density level (i.e. the low density level 401) in step S107. In this state, printed squares in the low density level 401 may have an almost identical density because of the density adjustment by using the drive voltage of the ink heads 12 (12a, 12b, 12c or 12d). Note that the density adjustment for the low density level 401 by using the drive voltage may affect the density of the intermediary density level 403 and the high density level 405, because the drive voltage of the ink heads 12 have been compensated for the density of the low density level 401.

A density difference may remain in the intermediary density level 403 and the high density level 405 after the density adjustment for the low density level 401 by using the drive voltage, because injection properties of the ink heads 12 differ from each other. Therefore, the image adjustment by the halftone processing is further done for the intermediary density level 403 and the high density level 405 in step S109 based on the above-explained adjustment values calculated in step S105 and the adjustment result of the low density level 401 done by the drive voltage controller 31c in step S107.

As shown in FIG. 6C, printed squares in the intermediary density level 403 and the high density level 405 (in addition to the low density level 401) have an almost identical density after the density adjustment by the halftone processing. Namely, a density difference is prevented in all the density levels after the density adjustment according to the inkjet image forming apparatus 1 in the present embodiment is completed.

According to the inkjet image forming apparatus 1 in the present embodiment, the density adjustment controller 31a prints the density adjustment pattern by injecting ink droplets from the nozzles of the ink heads 12 with a single dot pitch to form different printed areas with respect to each of the density levels and with respect to each of the inkjet heads 12, and then scan the density adjustment pattern to calculate the adjustment value for reducing a density difference among the ink heads 12 with respect to each of the density levels.

In addition, the density adjustment controller 31a adjusts density of the low density level 401 (the lowest density level among the density levels) so that the drive voltage controller 31c controls each drive voltage of the ink heads 12 based on the adjustment value of the low density level 401, and adjusts density of the intermediary density level 403 and the high density level 405 (each density level other than the lowest density level) so that the halftone processing controller 31d changes the number of ink droplets injected from each nozzle of the ink heads 12 by the halftone processing based on the adjustment value of the intermediary density level 403 and the high density level 405 and the adjustment result by the drive voltage controller 31c.

Therefore, since the density adjustment not by the halftone processing but by the drive voltage of nozzles is done for the lowest density level (i.e. the low density level 401), generation of a colorless portion(s) 215a to 215d as shown in FIG. 9 can be prevented. Since the density adjustment by the halftone processing is done for the intermediary density level 403 and the high density level 405 other than the low density level 401, a density difference can be prevented (restricted) in all the density levels. Note that the density adjustment by the drive voltage can adjust density among the ink heads 12 (i.e. with respect to each of the ink heads 12). The density adjustment by the halftone processing can adjust not only density among the ink heads 12 but also density in each of the ink heads 12 (i.e. with respect to each nozzle).

Especially, according to the inkjet image forming apparatus 1 in the present embodiment, the density adjustment pattern printed by each of the ink heads 12 is scanned, and then an average value of density of the density adjustment pattern is set as an adjustment value for each of the ink heads 12. Therefore, the density can be adjusted within its adequate range required for adequate injection of ink droplets.

In the above embodiment, the density adjustment controller 31a controls, by the drive voltage controller 31c, each drive voltage of the ink heads 12 so as to reduce a density difference among the ink heads 12 based on the adjustment value (e.g. the average value of densities) of the low density level 401 (i.e. the lowest density level among plural density levels). However, it is possible that each drive voltage of the ink heads 12 can be controlled so that a reference value including at least the adjustment value of the lowest density level is made smaller among the ink heads 12.

For example, in a case of three density levels 401, 403 and 405 as shown in FIG. 6A, a reference value is defined by a ratio (the adjustment value of the low density level 401: the adjustment value pf the high density level 405)=3:1, and the drive voltage of the ink heads 12 is controlled by the drive voltage controller 31c so that the reference value becomes smaller among the ink heads 12. According to this, the density adjustment can be done by reflecting not only the adjustment value of the low density level 401 but also the adjustment value pf the high density level 405.

The present invention is not limited to the above-mentioned embodiment, and it is possible to embody the present invention by modifying its components in a range that does not depart from the scope thereof. Further, it is possible to form various kinds of inventions by appropriately combining a plurality of components disclosed in the above-mentioned embodiment. For example, it may be possible to omit several components from all of the components shown in the above-mentioned embodiment.

The present application claims the benefit of a priority under 35 U.S.C. §119 to Japanese Patent Application No. 2013-243469, filed on Nov. 26, 2013, the entire content of which is incorporated herein by reference.

What is claimed is:

1. An inkjet image forming apparatus comprising:
 a plurality of ink heads that are aligned along a direction perpendicular to a feed direction of print sheet and configured to inject ink droplets with a plurality of density levels;
 a drive voltage controller configured to adjust density among the plurality of ink heads by controlling each drive voltage of the plurality of ink heads to change amounts of ink droplets injected from nozzles of the plurality of ink heads;
 a halftone processing controller configured to adjust density by changing the number of ink droplets ejected from each nozzle of the plurality of ink heads by a halftone processing; and
 a density adjustment controller configured to print a density adjustment pattern by injecting ink droplets from the nozzles of the plurality of ink heads with a single dot pitch to form different printed areas with respect to each of the plurality of density levels and with respect to each of the plurality of inkjet heads, and then scan the density adjustment pattern to calculate an adjustment value for reducing a density difference among the plurality of ink heads with respect to each of the plurality of density levels, wherein the density adjustment controller adjusts density of a lowest density level among the plurality of density levels so that the drive voltage controller controls each drive voltage of the plurality of ink heads based on the adjustment value of the lowest density level, and adjusts density of each density level other than the lowest density level so that the halftone processing controller changes the number of ink droplets injected from each nozzle of the plurality of ink heads by the halftone processing based on the adjustment value of each density level other than the lowest density level and an adjustment result by the drive voltage controller.

2. The inkjet image forming apparatus according to claim 1, wherein the density adjustment controller scans the density adjustment pattern printed with respect to each of the plurality of density levels and with respect to each of the plurality of inkjet heads, and the voltage drive controller controls each drive voltage of the plurality of ink heads based on a reference value including an average value of density of the density adjustment pattern of the lowest density level.

* * * * *